United States Patent [19]
Humphries

[11] Patent Number: 5,917,920
[45] Date of Patent: Jun. 29, 1999

[54] SAFETY VEHICLE COMMUNICATION SYSTEM

[76] Inventor: Alan Humphries, Plummers Cottage, Freiston Shore Boston, Lincs, United Kingdom, PE22OLY

[21] Appl. No.: 08/865,612

[22] Filed: May 29, 1997

[51] Int. Cl.$^6$ ...................................................... H04B 1/00
[52] U.S. Cl. ............................................................ 381/86
[58] Field of Search .................... 381/86, 71.4; 340/463, 340/474

[56] References Cited
U.S. PATENT DOCUMENTS 4,843,367  6/1989  Saito ........................................ 340/463
5,602,928  2/1997  Eriksson et al. .

*Primary Examiner*—Vivian Chang

[57] ABSTRACT

A new Safety Vehicle Communication System for allowing an occupant of a vehicle to converse with a pedestrian without having to open a door or window. The inventive device includes an interior microphone, an interior speaker, an exterior microphone, an exterior speaker and a switch for controlling the microphones and speakers.

11 Claims, 3 Drawing Sheets

SAFETY VEHICLE COMMUNICATION SYSTEM

BACKGROUND OF THE INVENTION

1. Field of the Invention

The present invention relates to Vehicle Intercom System and more particularly pertains to a new Safety Vehicle Communication System for allowing an occupant of a vehicle to converse with a pedestrian without having to open a door or window.

2. Description of the Prior Art

The use of Vehicle Intercom System is known in the prior art. More specifically, Vehicle Intercom System heretofore devised and utilized are known to consist basically of familiar, expected and obvious structural configurations, notwithstanding the myriad of designs encompassed by the crowded prior art which have been developed for the fulfillment of countless objectives and requirements.

Known prior art Vehicle Intercom System include U.S. Pat. No. 5,185,803; U.S. Pat. No. 4,965,833; U.S. Pat. No. 4,117,262; U.S. Design Pat. No. 332,100; U.S. Design Pat. No. 313,593; and U.S. Pat. No. 4,843,367.

While these devices fulfill their respective, particular objectives and requirements, the aforementioned patents do not disclose a new Safety Vehicle Communication System. The inventive device includes an interior microphone, an interior speaker, an exterior microphone, an exterior speaker and a switch for controlling the microphones and speakers.

In these respects, the Safety Vehicle Communication System according to the present invention substantially departs from the conventional concepts and designs of the prior art, and in so doing provides an apparatus primarily developed for the purpose of allowing an occupant of a vehicle to converse with a pedestrian without having to open a door or window.

SUMMARY OF THE INVENTION

In view of the foregoing disadvantages inherent in the known types of Vehicle Intercom System now present in the prior art, the present invention provides a new Safety Vehicle Communication System construction wherein the same can be utilized for allowing an occupant of a vehicle to converse with a pedestrian without having to open a door or window.

The general purpose of the present invention, which will be described subsequently in greater detail, is to provide a new Safety Vehicle Communication System apparatus and method which has many of the advantages of the Vehicle Intercom System mentioned heretofore and many novel features that result in a new Safety Vehicle Communication System which is not anticipated, rendered obvious, suggested, or even implied by any of the prior art Vehicle Intercom System, either alone or in any combination thereof.

To attain this, the present invention generally comprises an interior microphone, an interior speaker, an exterior microphone, an exterior speaker and a switch for controlling the microphones and speakers.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new Safety Vehicle Communication System apparatus and method which has many of the advantages of the Vehicle Intercom System mentioned heretofore and many novel features that result in a new Safety Vehicle Communication System which is not anticipated, rendered obvious, suggested, or even implied by any of the prior art Vehicle Intercom System, either alone or in any combination thereof.

It is another object of the present invention to provide a new Safety Vehicle Communication System which may be easily and efficiently manufactured and marketed.

It is a further object of the present invention to provide a new Safety Vehicle Communication System which is of a durable and reliable construction.

An even further object of the present invention is to provide a new Safety Vehicle Communication System which is susceptible of a low cost of manufacture with regard to both materials and labor, and which accordingly is then susceptible of low prices of sale to the consuming public, thereby making such Safety Vehicle Communication System economically available to the buying public.

Still yet another object of the present invention is to provide a new Safety Vehicle Communication System which provides in the apparatuses and methods of the prior art some of the advantages thereof, while simultaneously overcoming some of the disadvantages normally associated therewith.

Still another object of the present invention is to provide a new Safety Vehicle Communication System for allowing an occupant of a vehicle to converse with a pedestrian without having to open a door or window.

Yet another object of the present invention is to provide a new Safety Vehicle Communication System which includes an interior microphone, an interior speaker, an exterior microphone, an exterior speaker and a switch for controlling the microphones and speakers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
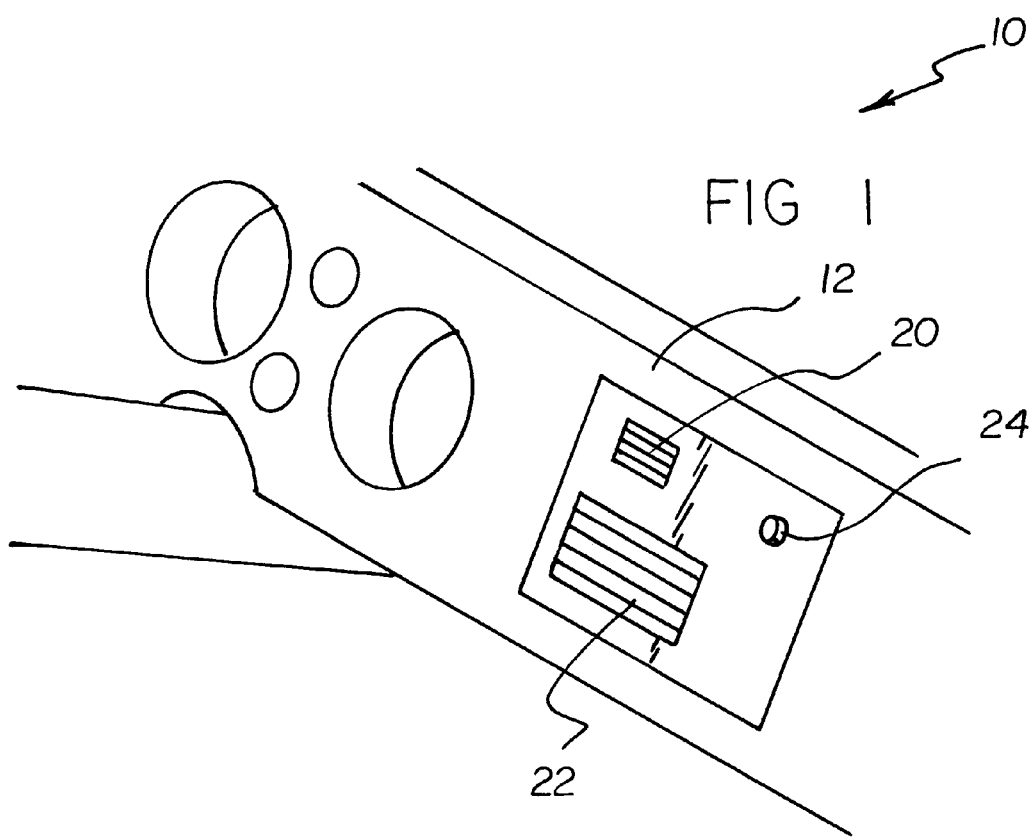
FIG. 1 is an upper perspective view of the interior intercom system.
Figure 2:
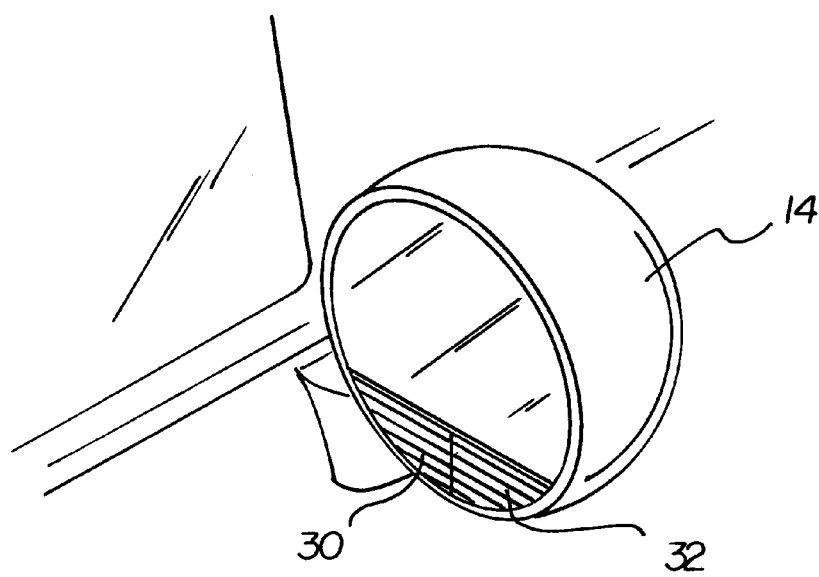
FIG. 2 is an upper perspective view of the exterior intercom system.
Figure 3:
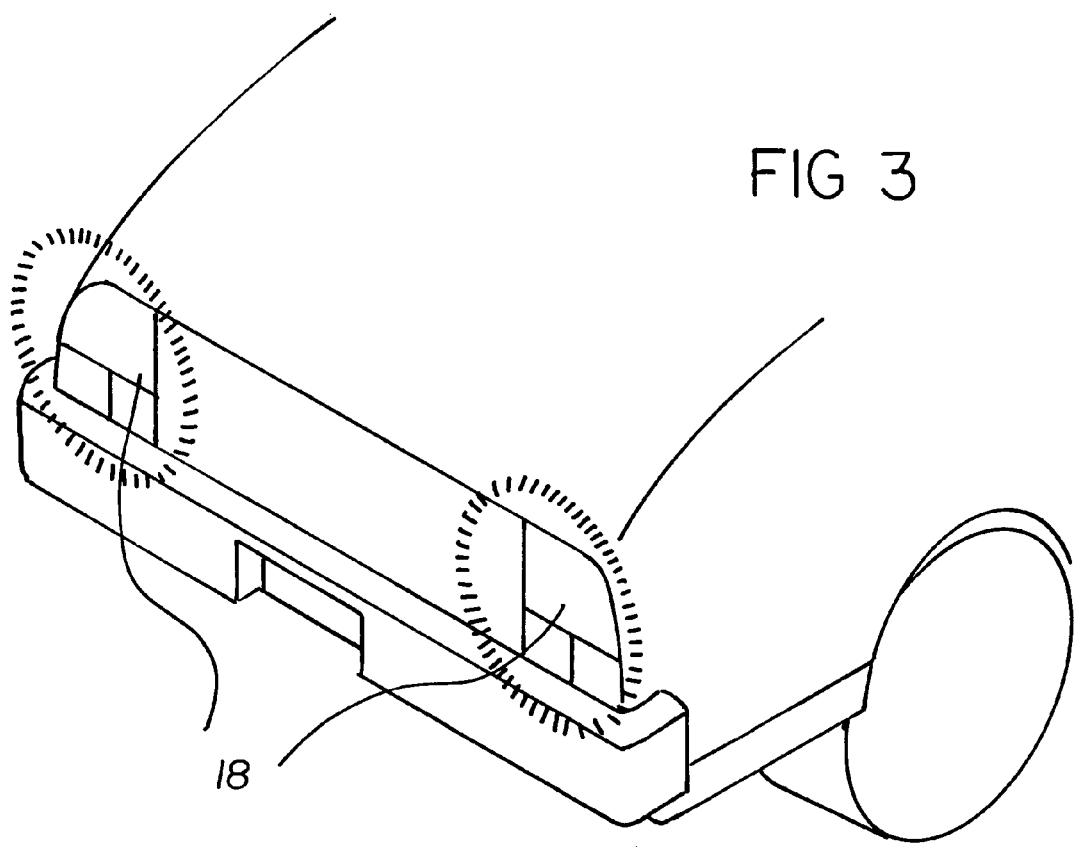
FIG. 3 is an upper perspective view of the hazard lights.
Figure 4:
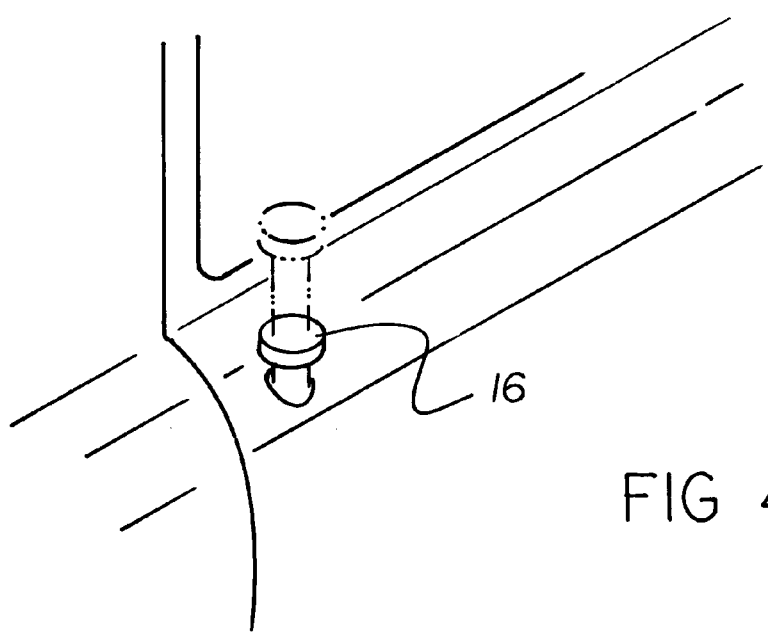
FIG. 4 is an upper perspective view of a lock.

With reference now to the drawings, and in particular to FIGS. 1 through 5 thereof, a new Safety Vehicle Communication System embodying the principles and concepts of the present invention and generally designated by the reference numeral 10 will be described.

As best illustrated in FIGS. 1 through 5, the Safety Vehicle Communication System 10 comprises an interior microphone 20 positioned within an interior portion of the vehicle, an exterior speaker 32 electrically connected to the interior microphone 20 and positioned within an exterior portion of the vehicle for emitting sound detected by the interior microphone 20, an exterior microphone 30 positioned within the exterior portion of the vehicle, and an interior speaker 22 electrically connected to the exterior microphone 30 and positioned within the interior portion of the vehicle for emitting sound detected by the exterior microphone 30. The exterior microphone 30 and the exterior speaker 32 are positioned within at least one side mirror 14 of the vehicle. The interior microphone 20 and the interior speaker 22 are preferably positioned within a dash 12 of the vehicle.

Figure 5:
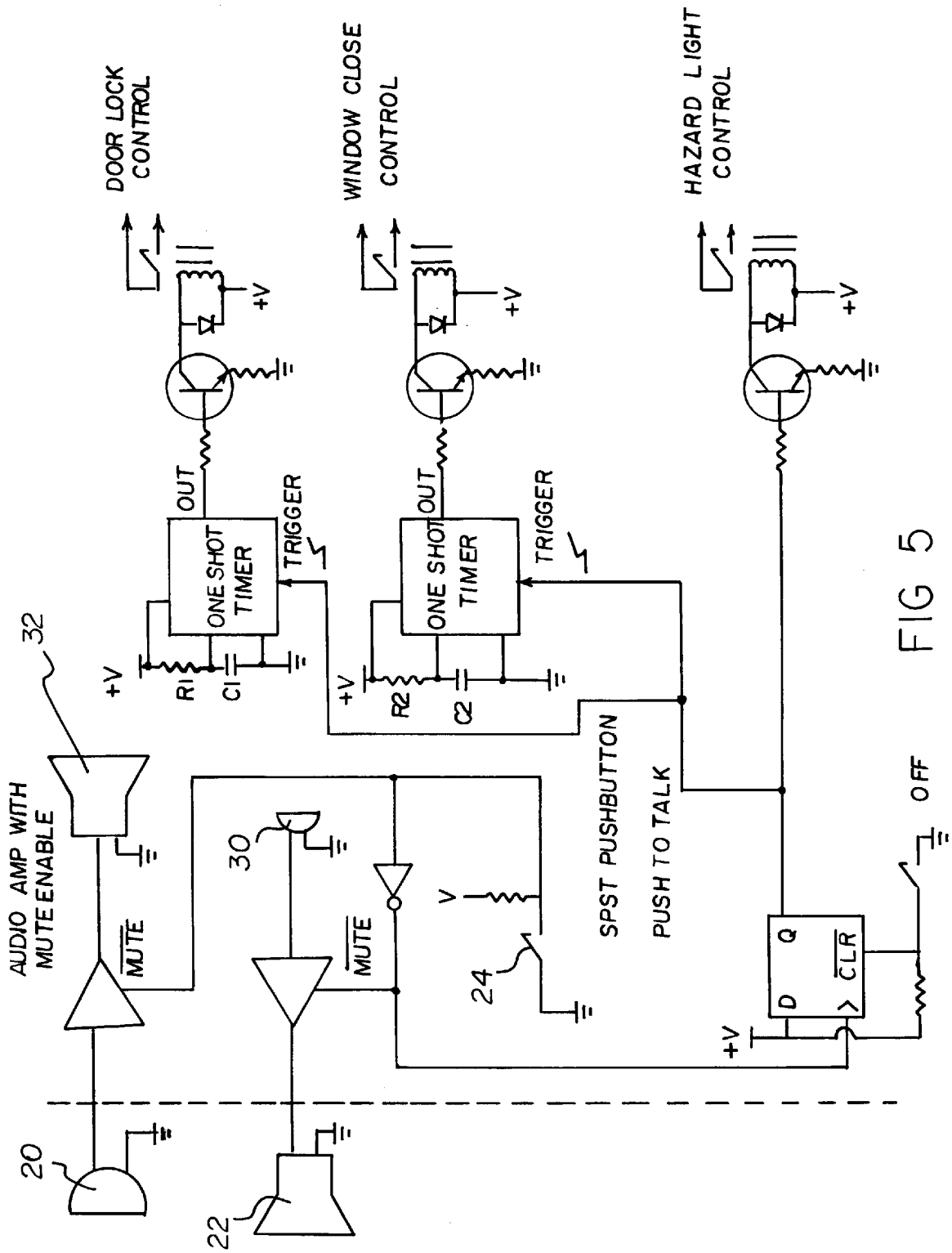
FIG. 5 is a schematic illustration of the present invention.

As shown in FIG. 5, a switch 24 is electrically connected between the interior microphone 20 and the exterior speaker 32. The switch 24 is electrically connected between the exterior microphone 30 and the interior speaker 22. The switch 24 is positioned within the interior portion of the vehicle for allowing the occupant of the vehicle to control an activation of the vehicle intercom system. The switch 24 is electrically connected to an electronic door lock controller for automatically locking a plurality of locks 16 within the vehicle upon a closing of the switch 24.

As shown in FIG. 5, the switch 24 is electrically connected to a plurality of hazard lights 18 for automatically flashing the hazard lights 18 upon the closing of the switch 24. The switch 24 is electrically connected to an electrical window controller whereupon the closing of the switch 24 the electrical window controller closes all windows within the vehicle automatically.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle intercom system for allowing an occupant of a vehicle to converse with a pedestrian outside of said vehicle without requiring opening of windows or doors of said vehicle, comprising:

an interior microphone positioned within an interior portion of said vehicle;

an exterior speaker electrically connected to said interior microphone and positioned within an exterior portion of said vehicle for emitting sound detected by said interior microphone;

an exterior microphone positioned within said exterior portion of said vehicle;

an interior speaker electrically connected to said exterior microphone and positioned within said interior portion of said vehicle for emitting sound detected by said exterior microphone; and a switch electrically connected between said interior microphone and said exterior speaker, and electrically connected between said exterior microphone and said interior speaker, and positioned within said interior portion of said vehicle for allowing said occupant of said vehicle to control an activation of said vehicle intercom system;

wherein said switch is electrically connected to an electronic door lock controller for automatically locking a plurality of locks within said vehicle upon a closing of said switch.

2. The vehicle intercom system of claim 1, wherein said switch is electrically connected to a plurality of hazard lights for automatically flashing said hazard lights upon said closing of said switch.

3. The vehicle intercom system of claim 2, wherein said switch is electrically connected to an electrical window controller whereupon said closing of said switch said electrical window controller closes all windows within said vehicle automatically.

4. The vehicle intercom system of claim 3, wherein said exterior microphone and said exterior speaker are positioned within at least one side mirror of said vehicle.

5. The vehicle intercom system of claim 4, wherein said interior microphone and said interior speaker are positioned within a dash of said vehicle.

6. A vehicle intercom system for allowing an occupant of a vehicle to converse with a pedestrian outside of said vehicle without requiring opening of windows or doors of said vehicle, comprising:

an interior microphone positioned within an interior portion of said vehicle;

an exterior speaker electrically connected to said interior microphone and positioned within an exterior portion of said vehicle for emitting sound detected by said interior microphone;

an exterior microphone positioned within said exterior portion of said vehicle;

an interior speaker electrically connected to said exterior microphone and positioned within said interior portion of said vehicle for emitting sound detected by said exterior microphone; and a switch electrically connected between said interior microphone and said exterior speaker, and electrically connected between said exterior microphone and said interior speaker, and positioned within said interior portion of said vehicle for allowing said occupant of said vehicle to control an activation of said vehicle intercom system;

wherein said switch is electrically connected to an electrical window controller whereupon said closing of said switch said electrical window controller closes all windows within said vehicle automatically.

7. The vehicle intercom system of claim 6, wherein said exterior microphone and said exterior speaker are positioned within at least one side mirror of said vehicle.

8. The vehicle intercom system of claim 7, wherein said interior microphone and said interior speaker are positioned within a dash of said vehicle.

9. A vehicle intercom system for allowing an occupant of a vehicle to converse with a pedestrian outside of said vehicle without requiring opening of windows or doors of said vehicle, comprising:

an interior microphone positioned within an interior portion of said vehicle;

an exterior speaker electrically connected to said interior microphone and positioned within an exterior portion of said vehicle for emitting sound detected by said interior microphone;

an exterior microphone positioned within said exterior portion of said vehicle;

an interior speaker electrically connected to said exterior microphone and positioned within said interior portion of said vehicle for emitting sound detected by said exterior microphone; and a switch electrically connected between said interior microphone and said exterior speaker, and electrically connected between said exterior microphone and said interior speaker, and positioned within said interior portion of said vehicle for allowing said occupant of said vehicle to control an activation of said vehicle intercom system;

wherein said switch is electrically connected to a plurality of hazard lights for automatically flashing said hazard lights upon said closing of said switch.

10. The vehicle intercom system of claim 9, wherein said exterior microphone and said exterior speaker are positioned within at least one side mirror of said vehicle.

11. The vehicle intercom system of claim 10, wherein said interior microphone and said interior speaker are positioned within a dash of said vehicle.

* * * * *